United States Patent
Amiri et al.

(10) Patent No.: US 11,577,961 B2
(45) Date of Patent: Feb. 14, 2023

(54) METHODS FOR PRODUCING GRAPHENE-BASED MATERIALS FROM GRAPHITE

(71) Applicant: THE TEXAS A&M UNIVERSITY SYSTEM, College Station, TX (US)

(72) Inventors: Ahmad Amiri, College Station, TX (US); Mohammad Naraghi, Cypress, TX (US)

(73) Assignee: THE TEXAS A&M UNIVERSITY SYSTEM, College Station, TX (US)

( * ) Notice: Subject to any disclaimer, the term of this patent is extended or adjusted under 35 U.S.C. 154(b) by 0 days.

(21) Appl. No.: 16/973,378

(22) PCT Filed: Jun. 14, 2019

(86) PCT No.: PCT/US2019/037177
§ 371 (c)(1),
(2) Date: Dec. 8, 2020

(87) PCT Pub. No.: WO2019/241627
PCT Pub. Date: Dec. 19, 2019

(65) Prior Publication Data
US 2021/0246030 A1    Aug. 12, 2021

Related U.S. Application Data

(60) Provisional application No. 62/685,327, filed on Jun. 15, 2018.

(51) Int. Cl.
*C01B 32/194* (2017.01)
*C01B 32/19* (2017.01)

(52) U.S. Cl.
CPC ............ *C01B 32/19* (2017.08); *C01B 32/194* (2017.08); *C01B 2204/04* (2013.01)

(58) Field of Classification Search
CPC ..... C01B 32/19; C01B 32/194; C01B 32/184; C01B 2204/04
See application file for complete search history.

(56) References Cited

U.S. PATENT DOCUMENTS

2016/0185603 A1    6/2016  Bozalina et al.

FOREIGN PATENT DOCUMENTS

| CN | 107043105 A |   | 8/2017 |
| CN | 105800603 B | * | 1/2018 |

OTHER PUBLICATIONS

Smeulders, D. E., et al. "Rod milling and thermal annealing of graphite: Passing the equilibrium barrier." Journal of materials science 40.3 (2005): 655-662.*

(Continued)

*Primary Examiner* — Richard M Rump
(74) *Attorney, Agent, or Firm* — Conley Rose, P.C.

(57) ABSTRACT

A method for manufacturing graphene-based materials includes (a) positioning graphite into an inner chamber of a rotatable housing of a rod mill. A plurality of elongate rigid rods are loosely positioned in the housing. In addition, the method includes (b) rotating the housing of the rod-mill after (a). Further, the method includes (c) rod milling the graphite with the rods during (b) to produce a first portion of the graphene-based materials and milled graphite. The first portion of the graphene-based materials include 30 layers or less of graphene and the milled graphite comprises more than 30 layers of graphene.

19 Claims, 5 Drawing Sheets

(56) References Cited

OTHER PUBLICATIONS

PCT/US2019/037177 International Search Report and Written Opinion dated Nov. 26, 2019 (13 p.).
Beata, Tryba et al., "Preparation of Exfoliated Graphite by Microwave Irradiation," Letters to the Editor, Carbon, vol. 43, Jul. 5, 2005, pp. 2397-2429 (3 p).
"Rod Mills: How do They Work?" Jun. 3, 2018, http://www.mine-engineer.com/mining/rodmill.htm (2 p.).
Abouzeid, Abdel-Zaher M. et al., "Flow of Materials in Rod Mills as Compared to Ball Mils in Dry Systems," International Journal of Mineral Processing, vol. 102-103, Oct. 1, 2011, pp. 51-57 (7 p).

\* cited by examiner

METHODS FOR PRODUCING GRAPHENE-BASED MATERIALS FROM GRAPHITE

CROSS-REFERENCE TO RELATED APPLICATIONS

This application is a 35 U.S.C. § 371 national stage application of PCT/US2019/037177 filed Jun. 14, 2019, and entitled "Methods for Producing Graphene-Based Materials from Graphite," which claims benefit of U.S. provisional patent application Ser. No. 62/685,327 filed Jun. 15, 2018, and entitled "Production of Graphene Nanoparticles and Single Layer Graphene from Graphite and Expanded Graphite Via Rod Milling," each of which is hereby incorporated herein by reference in its entirety for all purposes.

STATEMENT REGARDING FEDERALLY SPONSORED RESEARCH OR DEVELOPMENT

This invention was made with government support under FA9550-15-1-0170 awarded by Air Force Office of Scientific Research. The government has certain rights in the invention.

BACKGROUND

A variety of commercial products such as touch screens, battery straps, and tennis racquets are made with graphene and graphene-based materials such as multi-layer graphene and graphene nano-platelets. Usage of such materials (i.e., graphene, multi-layer graphene, and graphene nano-platlets) is expected to grow in coming years. However, production of such materials is limited (relatively low volume) and many conventional techniques for producing such materials may not be scalable, cost effective, or environmentally friendly.

BRIEF SUMMARY OF THE DISCLOSURE

Embodiments of methods for manufacturing and producing graphene-based materials are disclosed herein. In one embodiment, a method for manufacturing graphene-based materials comprises (a) positioning graphite into an inner chamber of a rotatable housing of a rod mill. A plurality of elongate rigid rods are loosely positioned in the housing. In addition, the method comprises (b) rotating the housing of the rod-mill after (a). Further, the method comprises (c) rod milling the graphite with the rods during (b) to produce a first portion of the graphene-based materials and milled graphite. The first portion of the graphene-based materials comprise 30 layers or less of graphene and the milled graphite comprises more than 30 layers of graphene.

In another embodiment disclosed herein, a method for manufacturing graphene-based materials comprising a plurality of particles having thicknesses less than about 15.0 nm comprises (a) positioning graphite into an inner chamber of a rotatable housing of a rod mill. A plurality of elongate rigid rods are loosely positioned in the housing. A ratio of a total weight of the plurality of rods in the inner chamber to a total weight of the graphite in the inner chamber is between 10 and 3000. In addition, the method comprises (b) rotating the housing of the rod mill after (a). Further, the method comprises (c) milling the graphite with the rods during (b) to exfoliate the graphite and produce milled graphite. Still further, the method comprises (d) exposing the milled graphite to microwaves to thermally exfoliate the milled graphite and produce the graphene-based materials.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF THE PREFERRED EMBODIMENTS

Figure 1:
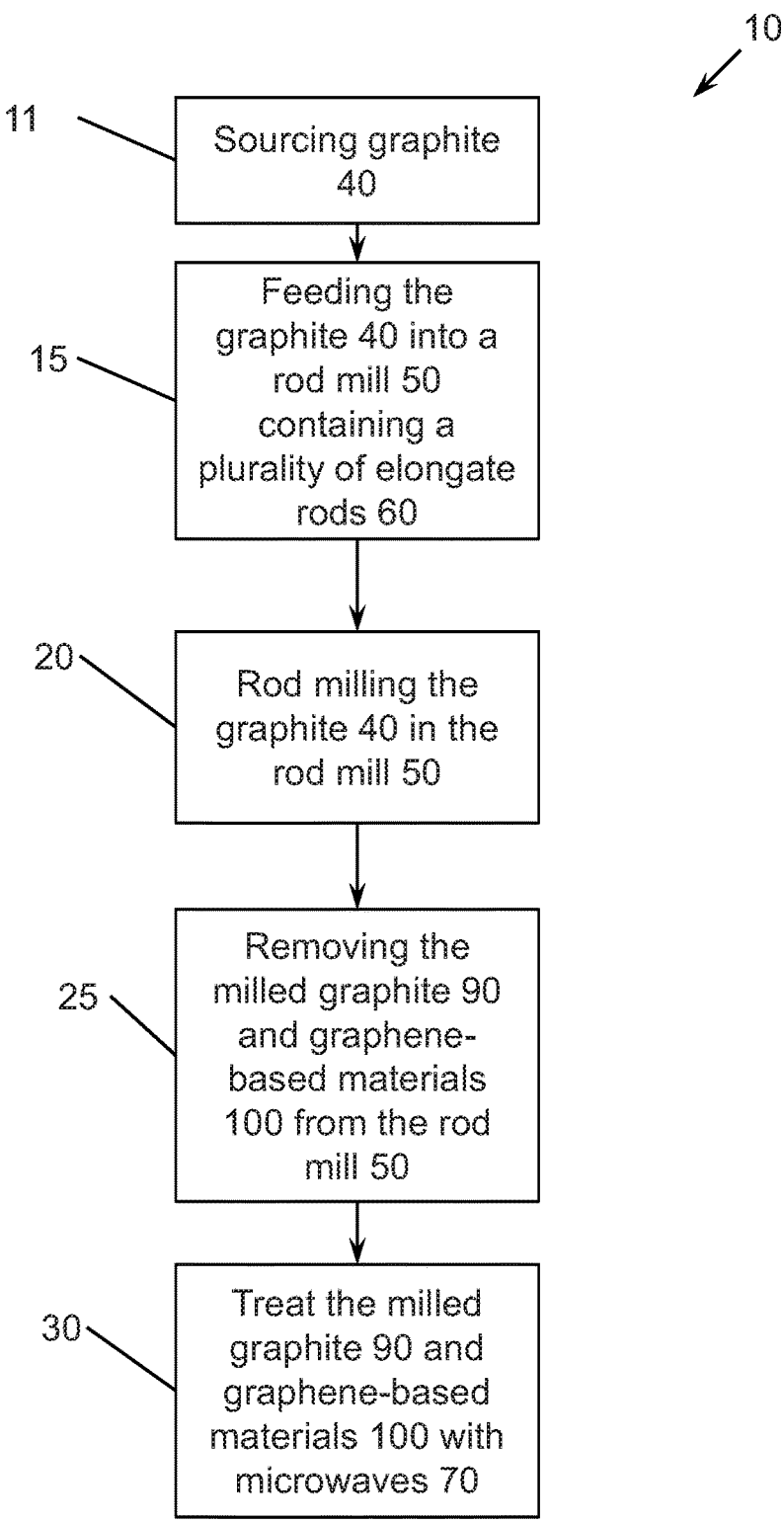
FIG. 1 is a flowchart illustrating an embodiment of a method for producing graphene-based materials.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

Unless the context dictates the contrary, all ranges set forth herein should be interpreted as being inclusive of their endpoints, and open-ended ranges should be interpreted to include only commercially practical values. Similarly, all lists of values should be considered as inclusive of intermediate values unless the context indicates the contrary.

In the following discussion and in the claims, the terms "including" and "comprising" are used in an open-ended fashion, and thus should be interpreted to mean "including, but not limited to . . . ." Also, the term "couple" or "couples"

is intended to mean either an indirect or direct connection. Thus, if a first device couples to a second device, that connection may be through a direct engagement between the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

Despite the potentially advantageous properties provided by graphene and similar graphene-based materials including strength, heat and electricity conduction efficiency, and large and nonlinear diamagnetism, production limitations have hampered their promotion and use. In particular, many convention methods for producing graphene and similar graphene-based materials such as multi-layer graphene and graphene nano-platelets are not scalable, cost effective, or environmentally friendly. For example, one conventional method for producing graphene and similar graphene-based materials is ball milling. More specifically, graphite is placed in a ball mill with a plurality of steel balls, and the ball mill is rotated to repeatedly impact the graphite with the steel balls. Such repeated impacts exfoliate graphene and similar carbon products from the graphite. However, due to the spherical geometry of the balls, the impact contact area between the balls and between the balls and the graphite are very small (approximately point contacts). The relatively small impact contact areas typically result in large impact forces per unit area, which in turn induces undesirable fragmentation (e.g., crushing and breaking of graphite material as opposed to exfoliation) and associated defects (e.g., lower quality products, reduced electrical conductivity, lower $sp^2$ hybridized carbon, etc.).

Other examples of conventional techniques for producing graphene and similar carbon products include electrochemical exfoliation and chemical vapor deposition (CVD) of graphene. However, these techniques often require the use of chemical compounds that may not be environmentally friendly.

As is known in the art, "graphene" is an allotrope of carbon having a two-dimensional, atomic scale, hexagonal lattice with a carbon atom at each vertex. Graphite has a layered carbon structure in which each individual, single carbon atom thick layer is "graphene." Materials having no more than 30 layers of graphene (e.g., 1 to 30 layers of graphene) are referred to herein as "graphene-based" materials. Examples of "graphene-based" materials include "few layer graphene," which includes 2-10 layers of graphene, and "graphene nano-platelets" (GNPs), which includes 10-30 layers of graphene. Since graphene is a single layer (i.e., has less than 30 layers), graphene may also be considered a "graphene-based" material. Thus, as used herein, the term "graphene-based material" refers to materials comprising 1 to 30 layers of graphene. Graphene (single layer) has a thickness of less than 1.0 nm (~0.34 nm), few-layer graphene has a thickness of about 1.0 to 4.0 nm, and GNPs have a thickness of less than about 15.0 nm. Thus, as defined herein, a "graphene-based material" has a thickness less than about 15.0 nm. In general, the thickness of a graphene-based material is measured parallel to a normal vector to a surface of the material. As will be described in more detail below, embodiments of methods described herein convert particles of graphite (e.g., graphite 40) into relatively smaller particles of graphene-based materials (e.g., graphene-based materials 100) via exfoliation of the graphite. In some embodiments, the exfoliation may occur over multiple steps. For example, in one step, the graphite may be partially converted into graphene-based materials, and in a second step after the first step, an additional portion of the graphite may be converted into graphene-based materials.

Figure 2:
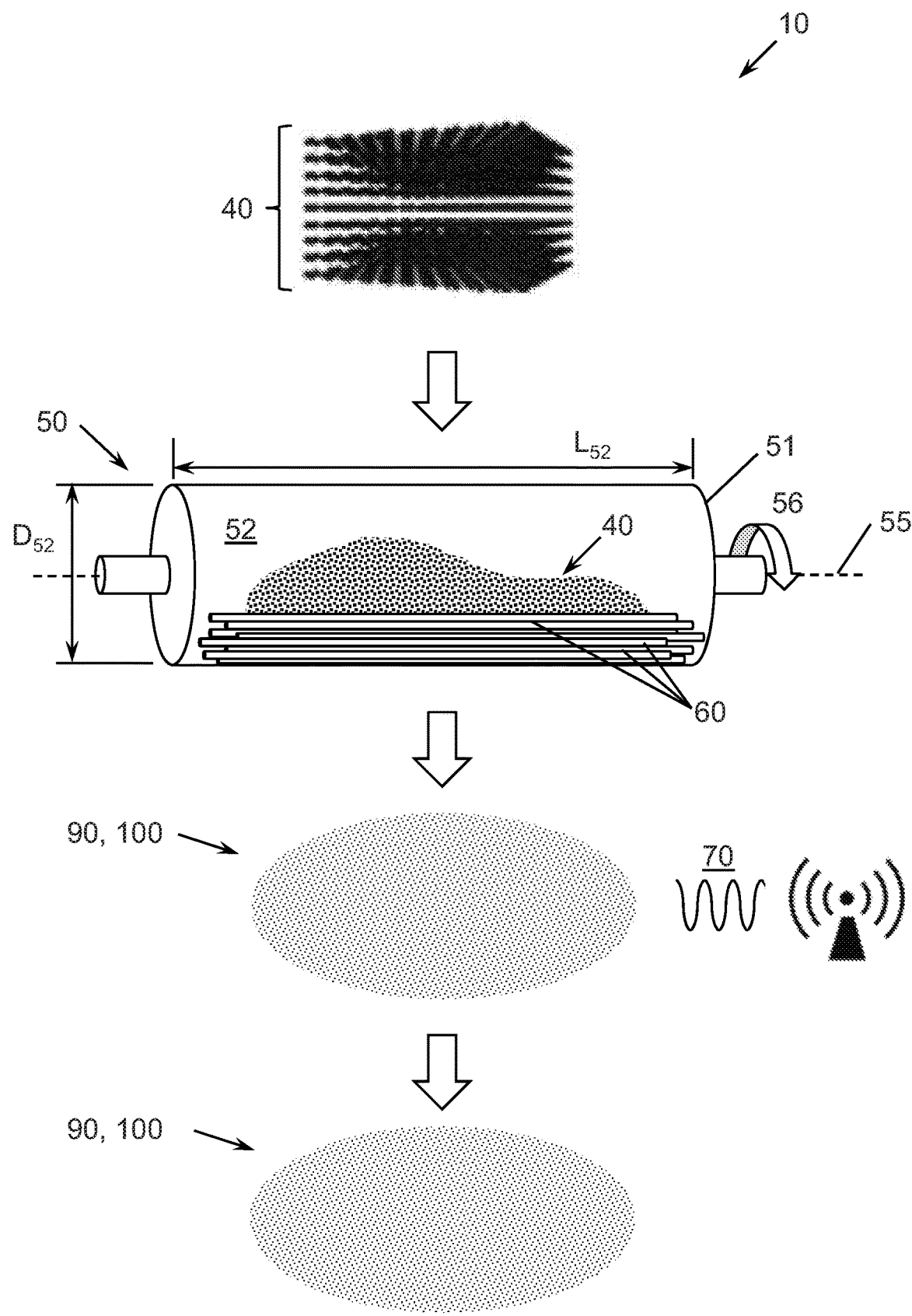
FIG. 2 is a schematic, pictorial illustration of the method of FIG. 1.

Referring now to FIGS. 1 and 2, an embodiment of a method 10 for producing graphene-based materials 100 is shown. As previously described, graphene-based materials 100 are materials having 1 to 30 layers of graphene and include single-layer graphene, few layer graphene, and GNPs. In this embodiment, method 10 begins at block 11 by sourcing or obtaining graphite 40, which serves as the raw material that is processed to produce graphene-based materials 90. In general, graphite 40 can comprise any type of graphite comprising layers of graphene including, pure graphite, graphite oxide, and expanded graphite at different sizes and thicknesses. In this embodiment, graphite 40 is in a powder form with each graphite particle having a size between about 1.0 μm and 500.0 μm. In general, graphite suitable for use as graphite 40 in method 100 is available from several different companies including Sigma-Aldrich® (now MilliporeSigma) of St. Louis, Mo., USA.

Moving now to block 15, graphite 40 sourced in block 11 is fed or placed into a rod mill 50. As best shown in FIG. 2, rod mill 50 includes an elongate cylindrical outer drum or housing 51 defining an inner milling chamber 52 and a plurality of elongate rigid milling rods 60 disposed in milling chamber 52. Housing 51 has a central axis 55 about which housing 51 rotates as shown by arrow 56.

Rods 60 and graphite 40 are loosely placed in chamber 52 such that they move freely relative to each other and housing 51 such that they move freely relative to each other and housing 51 as housing 51 rotates in direction 56. In this embodiment, housing 51 and rods 60 are made of stainless steel to enhance corrosion resistance and minimize potential impurities in the produced graphene-based materials 90. Examples of suitable stainless steels include Abrasion Resistant Steel (e.g., 200, 235, 400, 450 and 500), 304 stainless steel, Abrasion Resistant Polymers (Nylon and Acetal).

Moving now to block 20, housing 51 is rotated in direction 56 to rod mill graphite 40 within chamber 52 to exfoliate graphite 40 (e.g., surface layers of the particles of graphite 40 come part and are shed). For purpose of clarity and further explanation, the In particular, as rods 60 and graphite 40 tumble and spin within chamber 52, the particles of graphite 40 are periodically and repeatedly caught between impacting rods 60. As a result, the rods 60 exert impact loads and shearing loads on the particles of graphite 40, which crush and exfoliate (e.g., cut layers from) the particles of graphite 40. Without being limited by this or any particular theory, due to the geometry of rods 60, and in particular the cylindrical outer surfaces of rods 60, the impact area between rods 60 and the particles of graphite 40 is increased, the load per unit area between rods 60 and the particles of graphite 40 is decreased, and the shearing forces applied to the particles of graphite 40 is increased as compared to ball milling. These benefits offer the potential to reduce fragmentation and enhance exfoliation of the particles of graphite 40, thereby producing higher quality graphene-based materials (e.g., graphene-based materials 90).

In embodiments described herein, a plurality of milling parameters are adjusted and controlled to achieve relatively high quality graphene-based materials 100, which generally exhibit a relatively low degree of fragmentation and comprise particles having average sizes between about 200 nm and 50 microns and 1 to 30 layers of graphene. As used herein, the "size" of a particle of a graphene-based material refers to the average of its length and width measured in plane. It should be appreciated that the size of a particle of graphene-based material is different from the thickness of the particle of graphene-based material as described above. The milling parameters that can be adjusted and controlled include, without limitation, the size of chamber 52, the size of rods 60, the ratio of the total weight of rods 60 to the total weight of graphite 40 within chamber 52, the rotational speed of housing 51, and the duration of rod milling. Each of these milling parameters will now be discussed in turn.

Figure 3:
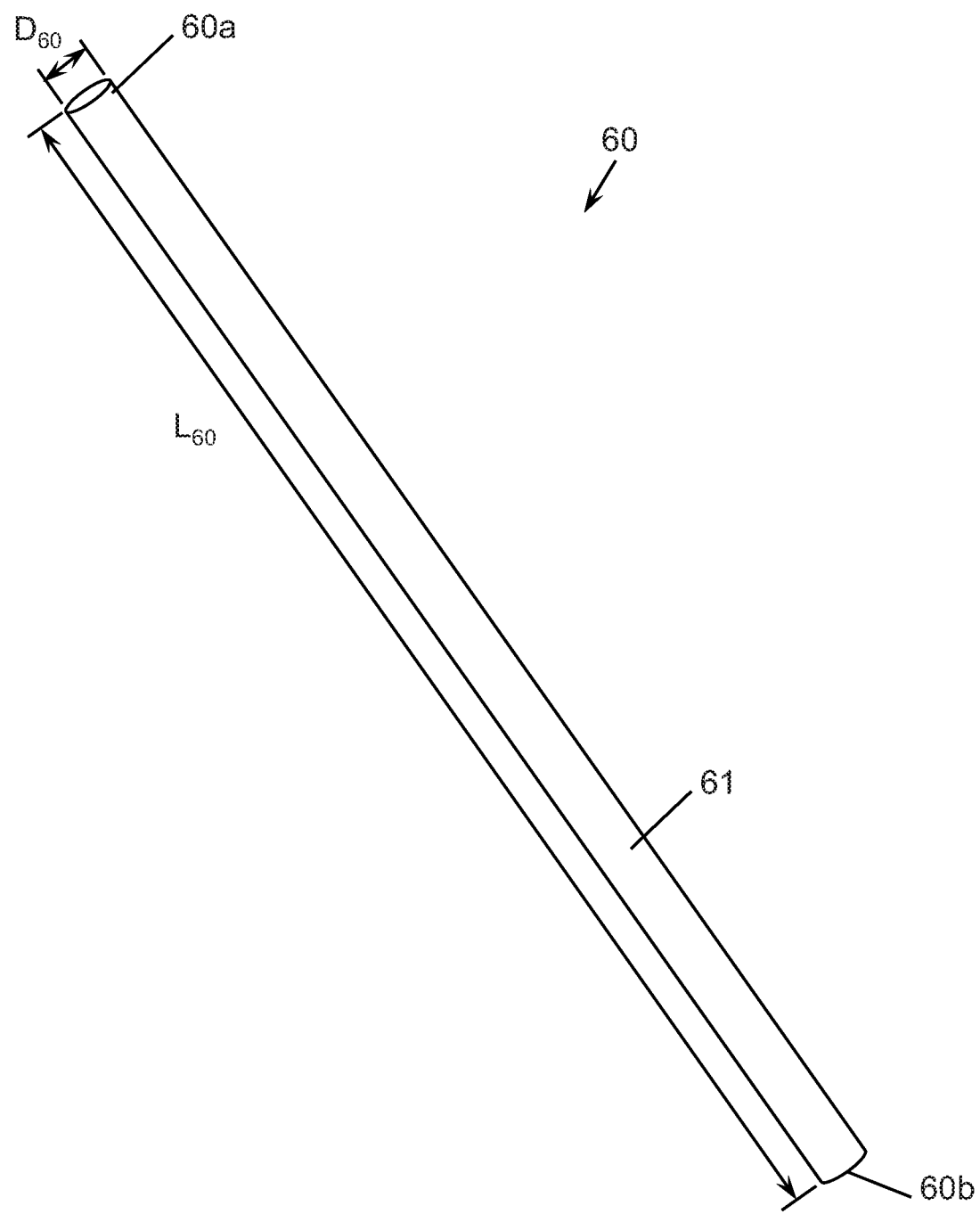
FIG. 3 is a perspective view of one of the rods of the rod mill of FIG. 2.

Regarding the size of chamber 52, as shown in FIG. 2, chamber 52 within housing 51 has a diameter $D_{52}$ and a length $L_{52}$. In embodiments described herein, the diameter $D_{52}$ is ranges from 10.0 cm to 2.0 m. The length $L_{52}$ of chamber 52 can be varied to scale the production of graphene-based materials 90 up or down. Regarding the size of rods 60, as shown in FIG. 3, each rod 60 has ends 60a, 60b, a cylindrical outer surface 61 extending between ends 60a, 60b, a length $L_{60}$ measured between ends 60a, 60b, and a width or diameter $D_{60}$. In embodiments described herein, the ratio of the length $L_{60}$ to the diameter $D_{60}$ of each rod 60, referred to herein as the "aspect ratio," is preferably between 1.0 and 1000.0, and more preferably between 2.0 and 100.0. In this embodiment, each rod 60 has the same length $L_{60}$ and diameter $D_{60}$, and thus, each rod 60 has the same aspect ratio. Without being limited by this or any particular theory, a larger aspect ratio generally results in increased impact areas between rods 60 and the particles of graphite 40, as well as increased shear forces applied to the particles of graphite 40.

The ratio of the total weight of rods 60 in chamber 52 to the total weight of graphite 40 in chamber 52 is preferably between 10 and 3000, and more preferably between 20 and 1500. The rotational speed of housing 51 during rod milling is preferably less than 400 RPM. In general, the greater the rotational speed of housing 51, the faster the rod milling process, and hence, the lower the duration of time to achieve the relatively high quality graphene-based materials. However, it may be advantageous to maintain the rotational speed of housing 51 below 400 RPM to ensure safety.

As previously described, rod milling graphite 40 in block 20 crushes and exfoliates the particles of graphite 40. Consequently, the resulting particles generally have smaller sizes and fewer layers as compared to the particles of graphite 40 supplied to rod mill 50 in block 15. A portion of graphite 40 supplied to rod mill 50 in block 15 may be sufficiently exfoliated in block 20 to produce graphene-based materials 100 having 1 to 30 layers of graphene. However, the remainder of graphite 40 supplied to rod mill 50 in block 15 may not be sufficiently exfoliated in block 20 to produce graphene-based materials 100 having 1 to 30 layers of graphene. Thus, in block 20, a portion of graphite 40 may be converted to graphene-based materials 100 (have 1 to 30 layers), while the remainder of graphite 40 is not converted to graphene-based materials 100 (have more than 30 layers). For purposes of clarity and further explanation, the portion of graphite 40 that is not converted into graphene-based materials 100 in block 20 is referred to herein as "milled graphite" and is designated with reference numeral 90. Thus, milled graphite 90 comprises particles with smaller sizes and fewer layers than graphite 40 supplied to rod mill 50 in block 15, but that still have greater than 30 layers of graphene (e.g., 30 to 100 layers). In general, the longer the duration of rod milling, the greater the exfoliation of graphite 40 and the greater percentage of graphite 40 that is converted into graphene-based materials 100. For most rod milling operations employing the rod milling parameters described above, the duration of rod milling in block 20 is preferably between 6 hours and 6 days to achieve a substantial conversion of graphite 40 to graphene-based materials 100 (e.g., up to about 50%) without inducing undue fragmentation and defects. In general, different types of imaging such as Atomic Source Microscopy (ASM) imaging and Scanning Electron Microscope (SEM) imaging can be used to periodically determine the degree of conversion of graphite 40 to graphene-based materials 100.

In this embodiment, graphite 40 is rod milled "dry" (e.g., without any other constituents added to chamber 52) and at ambient conditions (pressure, temperature, and environment). However, in other embodiments, other compounds may be added to the chamber 52 along with graphite 40 (e.g., organic solvent), graphite 40 may be rod milled in an inert environment (e.g., a pure nitrogen environment) to reduce impurities (e.g., reduce oxidation of the carbon), or combinations thereof.

Moving now to block 25, after rod milling in block 20, rotation of housing 51 of rod mill 50 is ceased, and graphene-based materials 100 and milled graphite 90 are removed from chamber 52 of rod mill 50. After removal from housing 51, graphene-based materials 100 and milled graphite 90 are treated via exposure to microwaves 70 in block 30. Thus, the exposure to microwaves 70 in block 30 is a post milling treatment. In particular, microwaves with frequencies between 300 MHz and 300 GHz are directed at graphene-based materials 100 and milled graphite 90 for a duration of 1.0 s to 1.0 hr, and more preferably 3.0 s to 1.0 min. The microwave treatment in block 30 heats up graphene-based materials 100 and milled graphite 90, which can trigger thermal exfoliation. For example, functional elements disposed between the graphene layers of graphene-based materials 100 and milled graphite 90 may expand at different rates than the layers of graphene and/or evaporate to push the graphene layers apart. Examples of such functional elements include, without limitation, oxygen-containing functional groups. Thus, the post rod milling microwave treatment in block 30 offers the potential to advantageously further reduce the number of graphene layers in the particles of graphene-based materials 100 and milled graphite 90 without significantly altering the size of the particles of graphene-based materials 100. The thermal exfoliation of milled graphite 90 via microwave treatment converts at least a portion of milled graphite 90 into graphene-based materials 100, thereby further increasing the yield of graphene-based materials 100 from graphite 40. In some embodiments, substantially all or all of milled graphite 90 is converted into graphene-based materials 100 via microwave treatment in block 70. In embodiments described herein, after rod milling in block 20 in accordance with the milling parameters described above and before microwave treatment in block 30, the particles of graphene-based materials 100 and milled graphite 90 have an average size of 200 nm to 50 micron and an average number of layers of graphene of 30 to 300 layers; whereas after rod milling in block 20 and microwave treatment in block 30, the particles of graphene-based materials 100 and milled graphite 90 (if any) have substantially the same average size of 200 nm to 50 micron and an average number of layers of graphene of 1 to 30 layers.

Figure 4:
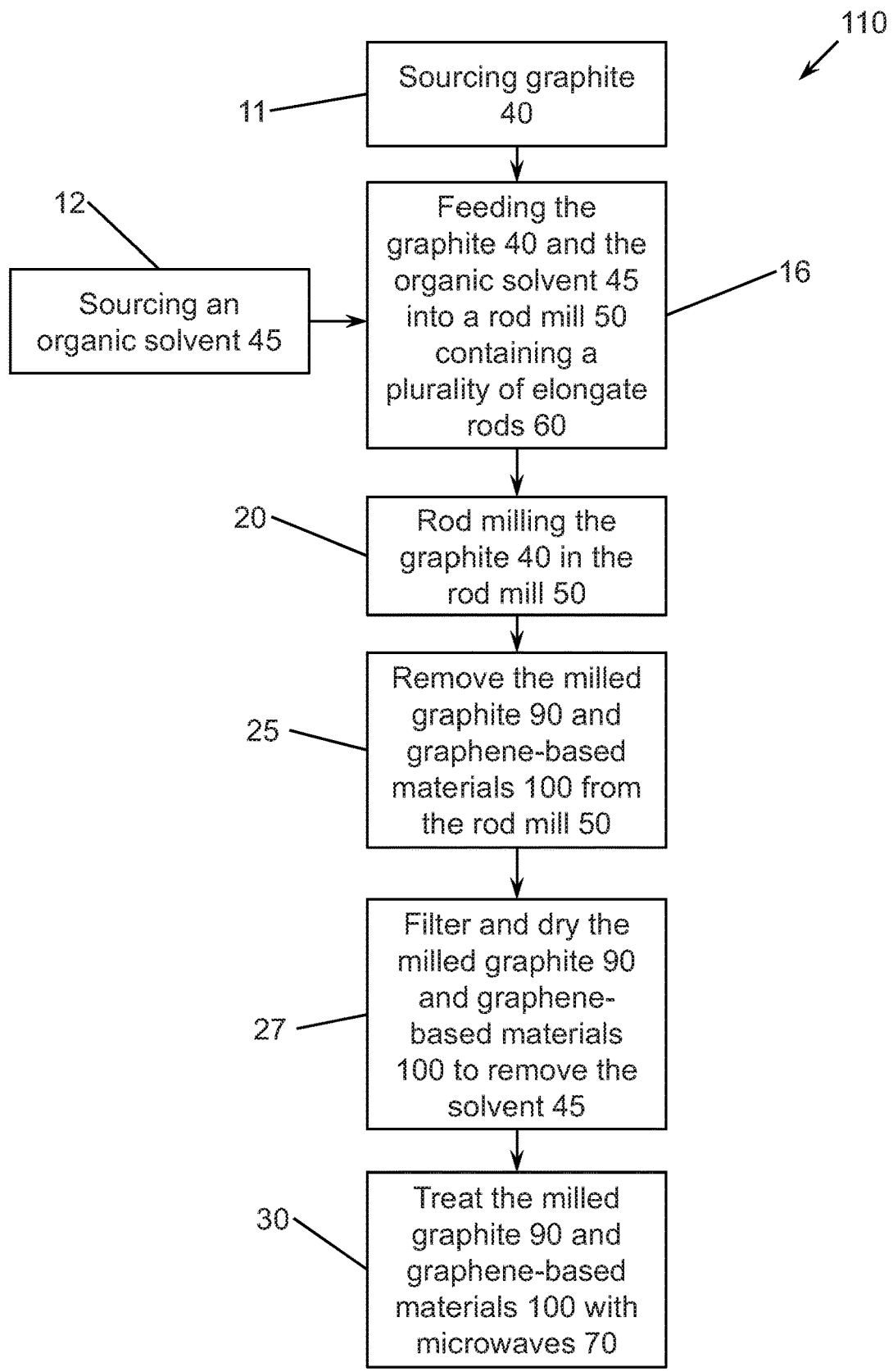
FIG. 4 is a flowchart illustrating an embodiment of a method for producing graphene-based materials.
Figure 5:
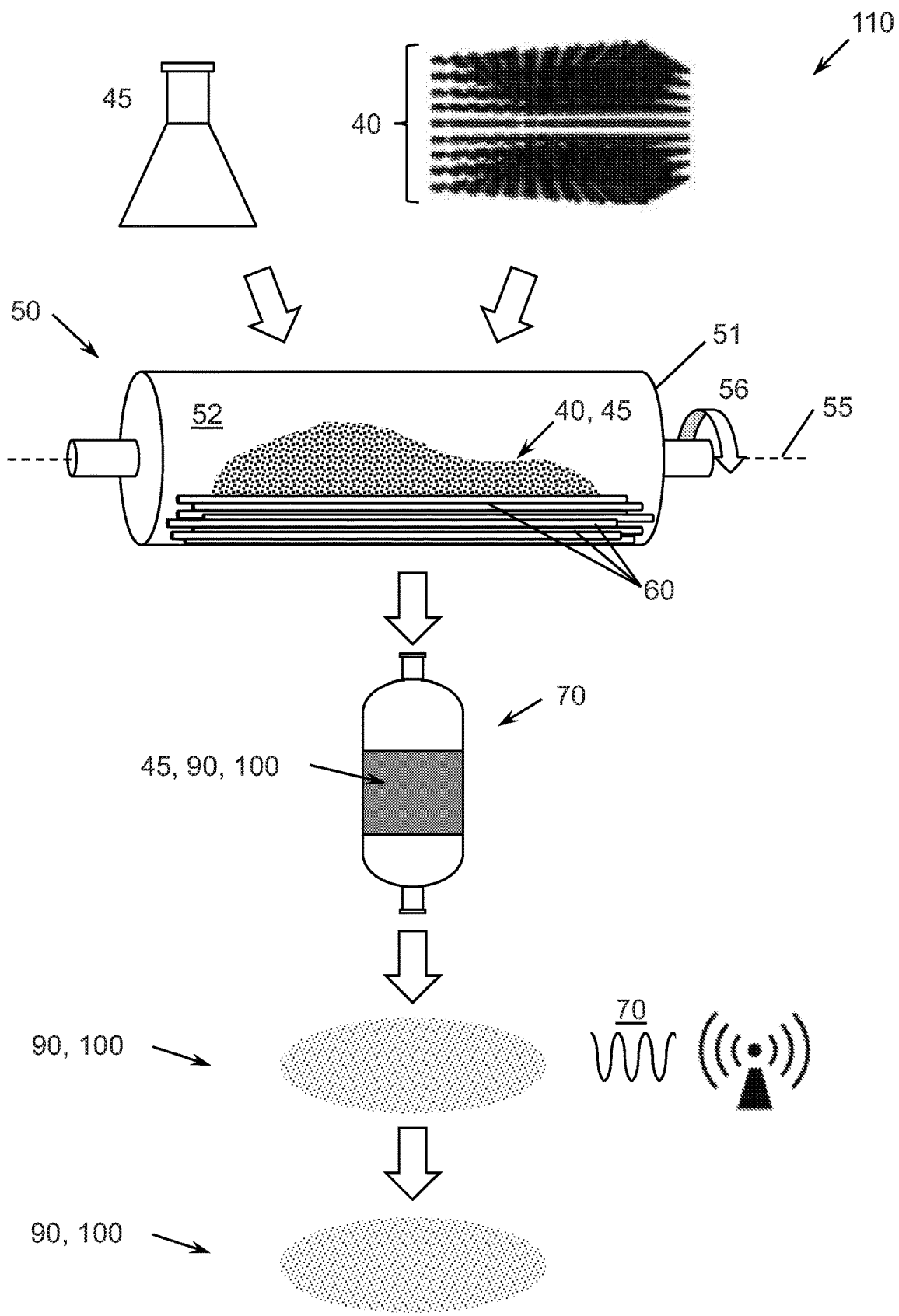
FIG. 5 is a schematic, pictorial illustration of the method of FIG. 4.

Referring now to FIGS. 4 and 5, an embodiment of a method 110 for producing graphene-based materials 100 is shown. As previously described, graphene-based materials 100 are materials having 1 to 30 layers (no more than 30 layers) of graphene and include single-layer graphene, few layer graphene, and GNPs. Method 110 is similar to method 10 previously described. In particular, method 110 includes blocks 11, 20, 25, 30, each as previously described. However, in this embodiment, method 110 includes additional blocks 12, 27 and replaces block 15 with block 16.

Referring still to FIGS. 4 and 5, method 110 begins at block 11 by sourcing or obtaining graphite 40 as previously described. Unlike method 10, in this embodiment, method 110 also includes sourcing or obtaining an organic solvent 45 in block 12. The organic solvent 45 serves to suspend the exfoliated graphene-based materials 100 and milled graphite 90 during rod milling in block 20, and offers the potential to facilitate conversion of few layer graphene (2-10 layers of graphene) to graphene (single or mono layer) and bi-layer graphene (two layers of graphene). To facilitate suspension of graphene-based materials 100 and milled graphite 90 during rod milling, organic solvent 45 preferably exhibits has a surface tension that is the same or similar to the surface energy of graphite 40. The surface energy of graphite (e.g., graphite 40) is generally known to be between about 45 and 90 mJ/m$^2$, and more specifically about 68 mJ/m$^2$. Thus, organic solvent 45 preferably exhibits a surface tension between about 45 and 90 mJ/m$^2$ or within 10% of this range. Without being limited by this or any particular theory, by matching or substantially matching the surface tension of organic solvent 45 with the surface energy of graphite 40, the organic solvent 45 provides sufficient energy to overcome Van der Waals forces between layers of graphene in graphite 40, thereby pushing apart and exfoliating the layers. For large scale production of graphene-based materials 100, organic solvent 45 preferably has a relatively low cost. Examples of suitable organic solvents 45 for use in method 110 include N-methyl-2-pyrrolidone (NMP) and N,N-dimethylformamide (DMF).

Moving now to block 16, graphite 40 sourced in block 11 and organic solvent 45 source in block 12 are fed into a rod mill 50. In particular, rods 60, graphite 40, and organic solvent 45 are loosely placed in chamber 52 such that they move freely relative to each other and housing 51 as housing 51 rotates in direction 56. Next, in block 20, housing 51 is rotated in direction 56 to rod mill graphite 40 within chamber 52 to exfoliate graphene-based materials 100 and milled graphite 90 from graphite 40 as previously described. In this embodiment, graphene-based materials 100 and milled graphite 90 exfoliated from graphite 40 are suspended by organic solvent 45 within chamber 52 during rod milling. In general, the milling parameters selected and used in method 110 are the same as those selected and used in method 10 previously described. For example, chamber 52 has a diameter $D_{52}$ that from 10.0 cm to 2.0 m; rods 60 preferably have aspect ratios between 1.0 and 1000.0, and more preferably between 2.0 and 100.0; the ratio of the total weight of rods 60 in chamber 52 to the total weight of graphite 40 in chamber 52 is preferably between 10 and 3000, and more preferably between 20 and 1500; the rotational speed of housing 51 during rod milling is preferably less than 400 RPM; and the duration of rod milling in block 20 is preferably between 6 hours and 6 days.

Unlike method 10, in this embodiment, graphite 40 is rod milled "wet" (e.g., with organic solvent 45 added to chamber 52) and at ambient conditions (pressure, temperature, and environment). However, in other embodiments, additional compounds may be added to the chamber 52 along with graphite 40 and organic solvent 45, graphite 40 may be rod milled in an inert environment (e.g., a pure nitrogen environment) to reduce impurities (e.g., reduce oxidation of the carbon), or combinations thereof.

Referring still to FIGS. 4 and 5, moving now to block 25, after rod milling in block 20, rotation of housing 51 of rod mill 50 is ceased, and graphene-based materials 100 and milled graphite 90 are removed from chamber 52 of rod mill 50. Graphene-based materials 100 and milled graphite 90 removed from chamber 52 are mixed with organic solvent 45 during rod milling, and thus, graphene-based materials 100 and milled graphite 90 removed from chamber 52 are "wet" with organic solvent 45. Accordingly, in this embodiment, wet graphene-based materials 100 and milled graphite 90 are filtered with a filtration system 70 and dried in block 27 to remove organic solvent 45 from graphene-based materials 100. Next, graphene based materials 100 and milled graphite 90 are treated via exposure to microwaves 70 in block 30 as previously described.

In the manner described, embodiments disclosed herein include methods (e.g., methods 10, 110) for producing graphene-based materials (e.g., graphene-based materials 100). The use of rod milling in embodiments described herein, as opposed to other techniques for producing graphene-based materials, offer the potential to reduce the impact forces per unit area and increase shear forces applied to the graphite raw materials, which efficiently exfoliate graphene-based materials from the graphite with less fragmentation and associated defects. These benefits enhance production efficiency and yield of graphene-based materials, as well as reduce production time, thereby offering potentially scalable processes for producing graphene-based materials from graphite. It should also be appreciated that some embodiments described herein such as method 10 do not include or require the use of chemical compounds that may be harmful to the environment, and thus, provide offer the potential for environmentally friendly processes for producing graphene-based materials from graphite.

While preferred embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method for manufacturing graphene-based materials, the method comprising:
   (a) positioning graphite into an inner chamber of a rotatable housing of a rod mill, wherein a plurality of elongate rigid rods are loosely positioned in the housing;
   (b) rotating the housing of the rod-mill after (a);
   (c) rod milling the graphite with the rods in the inner chamber of the housing during (b) to produce a first plurality of particles defining a first portion of the graphene-based materials and a second plurality of particles comprising milled graphite, wherein the first portion of the graphene-based materials comprise 30 layers or less of graphene and the milled graphite comprises more than 30 layers of graphene, wherein the first plurality of particles and the second plurality of particles, collectively, have an average number of layers of graphene that ranges from 30 to 300 layers, wherein rod milling the graphite in (c) comprises dry milling the graphite without a solvent.

2. The method of claim 1, further comprising:
   (d) exposing the first portion of the graphene-based materials and the milled graphite to microwaves.

3. The method of claim 2, further comprising:
   thermally exfoliating the milled graphite during (d) to convert at least a portion of the milled graphite to a third plurality of particles defining a second portion of the graphene-based materials, wherein the second portion of the graphene-based materials comprise 30 layers or less of graphene.

4. The method of claim 2, further comprising exposing the first portion of the graphene-based materials and the milled graphite to microwaves for at least 1.0 second.

5. The method of claim 4, further comprising exposing the first portion of the graphene-based materials and the milled graphite to microwaves for 3.0 to 60.0 seconds.

6. The method of claim 2, further comprising removing the first portion of the graphene-based materials and the milled graphite from the inner chamber before (d).

7. The method of claim 3, wherein each of the first plurality of particles defining the first portion of the graphene-based materials and each of the third plurality of particles defining the second portion of the graphene-based materials has a thickness less than about 15.0 nm.

8. The method of claim 1, wherein each rod has an aspect ratio between 2.0 and 100.0.

9. The method of claim 1, wherein a ratio of a total weight of the plurality of rods in the inner chamber to a total weight of the graphite in the inner chamber is between 10 and 3000.

10. The method of claim 9, wherein the ratio is between 20 and 1500.

11. The method of claim 1, wherein the housing is rotated for a time duration of 6 hours to 6 days during (b).

12. The method of claim 11, wherein the housing is rotated at a speed of less than 400 revolutions per minute (RPM) during (b).

13. The method of claim 1, wherein the housing and the plurality of rods are made of stainless steel.

14. A method for manufacturing graphene-based materials comprising a plurality of particles having thicknesses less than about 15.0 nm, the method comprising:
   (a) positioning graphite into an inner chamber of a rotatable housing of a rod mill, wherein a plurality of elongate rigid rods are loosely positioned in the housing, and wherein a ratio of a total weight of the plurality of rods in the inner chamber to a total weight of the graphite in the inner chamber is between 10 and 3000;
   (b) rotating the housing of the rod mill after (a);
   (c) milling the graphite with the rods during (b) to exfoliate the graphite and produce a first plurality of particles defining a first portion of the graphene-based materials and a second plurality of particles comprising milled graphite, wherein the first plurality of particles and the second plurality of particles, collectively, have an average number of layers of graphene that ranges from 30 to 300 layers, wherein milling the graphite in (c) comprises dry milling the graphite without a solvent; and
   (d) exposing the milled graphite to microwaves to thermally exfoliate the milled graphite and produce the graphene-based materials.

15. The method of claim 14, wherein (d) comprises exposing the milled graphite to microwaves for at least 1.0 second.

16. The method of claim 14, wherein each rod has an aspect ratio between 2.0 and 100.0.

17. The method of claim 16, wherein the ratio of the total weight of the plurality of rods in the inner chamber to the total weight of the graphite in the inner chamber is between 20 and 1500.

18. The method of claim 14, wherein the housing is rotated for a time duration of 6 hours to 6 days during (b).

19. The method of claim 14, wherein the housing is rotated at a speed of less than 400 revolutions per minute (RPM) during (b).

* * * * *